Figure 1:
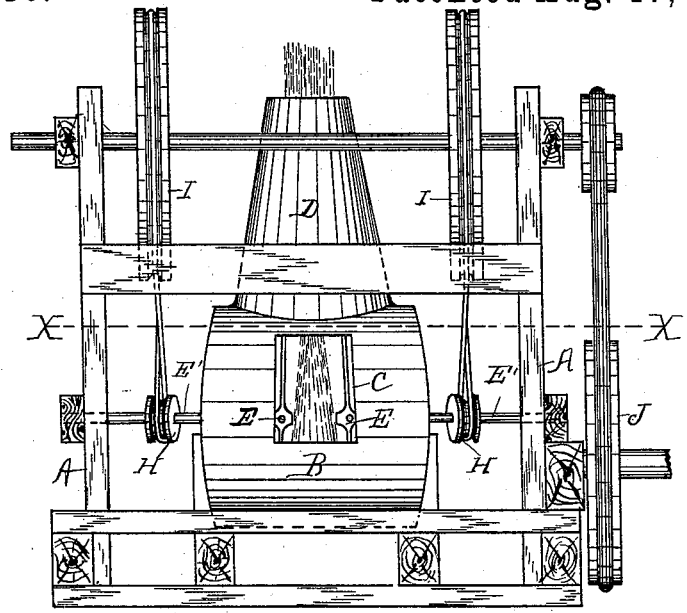

(No Model.)

S. H., D. & P. A. GARST.
BLOWER FOR PNEUMATIC STRAW STACKERS.

No. 588,416. Patented Aug. 17, 1897.

WITNESSES:
L. L. Allen
B. McCarty

INVENTORS.
S. H. Garst,
Dudley Garst,
P. A. Garst,
By R. J. McCarty,
their ATTORNEY.

UNITED STATES PATENT OFFICE.

STEPHEN H. GARST, DUDLEY GARST, AND PERCY A. GARST, OF GREENVILLE, OHIO.

BLOWER FOR PNEUMATIC STRAW-STACKERS.

SPECIFICATION forming part of Letters Patent No. 588,416, dated August 17, 1897.

Application filed January 14, 1897. Serial No. 619,229. (No model.)

*To all whom it may concern:*

Be it known that we, STEPHEN H. GARST, DUDLEY GARST, and PERCY A. GARST, citizens of the United States, residing at Greenville, in the county of Darke and State of Ohio, have invented certain new and useful Improvements in Blowers for Pneumatic Straw-Stackers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in blowers and exhausters for pneumatic conveyers.

The object of the invention is to provide a blower especially adapted to delivering straw to the pneumatic tube of a straw-stacker in an unbroken condition. So far as we are aware the blowers now in use for this purpose are objectionable for the following reasons:

First. The straw passing through the fans is unavoidably cut and broken into short pieces. This cutting or breaking, or what is otherwise known as "grinding," necessitates the expenditure of considerable more power than is necessary for the ordinary purposes of a blower for this work, and the wear and tear upon the casing, fan-blades, and bearings are severe and tend to greatly curtail the usefulness of the blower.

Secondly. When the straw is delivered by the blower in a cut and broken condition, it is impossible to build a stack that will resist the weather. The straw being broken into small pieces, it will not hold together. Therefore the stack will not retain its cone shape. In stacking straw in the open air it is highly essential in order to preserve it that the stack retain its cone shape in order that it may shed water. Rain, for example, falling upon the cone or slanting sides of the stack will readily pass off without damage to the straw. When the stack is formed of short or broken hay, the wind will soon destroy the cone shape.

Thirdly. It is difficult to handle short straw on a wagon or load it with a pitchfork. Therefore the producers are put to greater labor and expense in transporting it.

The main object of the present invention is to remove the above difficulties by providing a blower so constructed that the straw does not come in contact with the fans or anything on the interior of the case that would have the least tendency to damage the same.

To the foregoing ends the invention consists of structural features and the arrangements of parts, as will hereinafter more fully appear from the specification, taken in connection with the accompanying drawings, of which—

Figure 2:
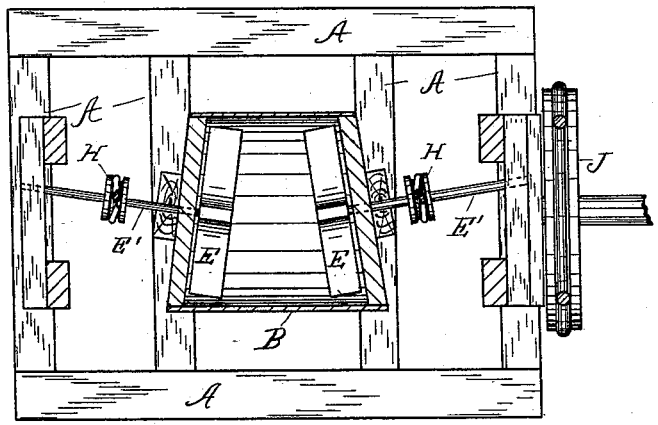
Figure 3:
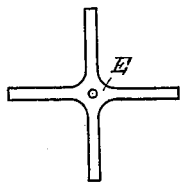

Figure 1 is a front elevation of our improved straw-blower. Fig. 2 is a sectional view on the line $xx$ of Fig. 1. Fig. 3 is a detail side elevation of one of the rotary fans.

Similar letters of reference indicate corresponding parts in the several views.

A designates the parts constituting the supporting-frame, which of course may be materially changed as circumstances may require.

B designates a blower-casing which is suitably mounted on said frame. This casing is essentially constructed with its sides inclining inwardly to the rear to provide a converging or gradually-narrowing interior space. The front of the casing has a door or opening C of suitable size for the introduction of straw.

D designates a chute extending from the upper side of the casing and terminating at its upper end in a substantially narrower outlet. This chute discharges the straw into the lower end of the straw-stacker in a well-known manner. Therefore it has not been thought necessary to illustrate any of the well-known features of the straw-stacker.

E E designate two rotary fans mounted on two independent shafts E' E', that are provided with suitable bearings. For the purposes of this invention these fans are mounted on angles that conform to the angles of the sides of the casing B, and they necessarily occupy positions close to the sides of the casing in order to provide an unobstructed intervening space, substantially as shown in Fig. 2. In the present arrangement the fans are driven at a suitably high rate of speed to generate a proper current of air by differential pulleys H H and I I, the latter being mounted on a shaft driven from a main pulley J. Owing to the particular positions of the fans a current of air is produced in the intervening space which forces the straw upward in a uniform column, substantially as is shown in Fig. 1, the dotted lines representing the course of the ascending straw. The straw thus acted upon is kept in a central position, so that it is prevented from coming in contact with the fan-blades, and there being no obstructions in the intervening space it is forced rapidly upward in a uniform column, as hereinbefore stated. It will be understood that a corresponding current of air is created by each of the rotating fans. This air being driven to the center of the casing unites and acquires an accelerated force, which is further augmented by the converging character of said intervening space. The advantages of our invention lie in thus concentrating a current of air into an unobstructed space between the two fans and into which the straw is fed and is kept in a central position by the two opposing currents of air.

While the blower has been described in connection with pneumatic straw-stackers, it will be understood that its usefulness is not confined to that alone. On the contrary, its utility is available as an exhaust-fan, or it may be used in factories as a blower to convey such materials as rags, paper, pulp, sawdust, &c. In either of these uses the material passes off between the fans similar to the way the straw is acted upon and does not become ground or broken up by coming in contact with the fans or any obstructions within the casing.

Having fully described our invention, we claim—

1. A blower for pneumatic straw-stackers, comprising a casing; two rotary fans independently mounted in said casing face to face at angles substantially as set forth, and with an unobstructed space between them into which the straw is fed, and out of which said straw is forced by a concentrated current of air generated by said fans, whereby the said straw is prevented from coming in contact with the revolving fans, substantially as set forth.

2. In a blower for pneumatic straw-stackers, the combination with a casing having its sides inclining inwardly to the rear, of two rotating fans mounted oppositely in said casing at angles conforming to the angles of the sides of the casing, there being a substantial space between said fans, said space being essentially unobstructed, and into which the current of air generated by the rotating fans is concentrated to force straw outwardly through said casing, substantially as described.

In testimony whereof we affix our signatures in presence of two witnesses.

STEPHEN H. GARST.
    DUDLEY GARST.
    PERCY A. GARST.

Witnesses:
 E. E. CALDERWOOD,
 J. F. BURTCH.